United States Patent
Owen, Sr.

(10) Patent No.: US 8,003,888 B2
(45) Date of Patent: Aug. 23, 2011

(54) ELECTRICAL JUNCTION ASSEMBLY FOR WIRING HARNESS

(75) Inventor: Robert H. Owen, Sr., Columbia City, IN (US)

(73) Assignee: Federal-Mogul Ignition Company, Southfield, MI (US)

( * ) Notice: Subject to any disclaimer, the term of this patent is extended or adjusted under 35 U.S.C. 154(b) by 548 days.

(21) Appl. No.: 12/194,959

(22) Filed: Aug. 20, 2008

(65) Prior Publication Data
US 2009/0101406 A1    Apr. 23, 2009

Related U.S. Application Data

(60) Provisional application No. 60/980,873, filed on Oct. 18, 2007.

(51) Int. Cl.
*H02G 3/04* (2006.01)
(52) U.S. Cl. .................... 174/72 A; 174/68.1; 174/135; 439/207; 248/68.1
(58) Field of Classification Search .................. 174/68.3, 174/72 A, 84 R, 68.1, 135; 248/68.1; 439/207
See application file for complete search history.

(56) References Cited

U.S. PATENT DOCUMENTS

| | | | |
|---|---|---|---|
| 3,984,622 A * | 10/1976 | Ross ........................... | 174/72 A |
| 4,603,930 A | 8/1986 | Ito | |
| 4,797,512 A * | 1/1989 | Kumagai et al. .............. | 174/135 |
| 4,910,641 A | 3/1990 | Yanase | |
| 4,915,637 A | 4/1990 | Ogawa et al. | |
| 4,943,109 A | 7/1990 | Skrbina et al. | |
| 5,015,199 A | 5/1991 | Hirano et al. | |
| 5,618,186 A | 4/1997 | Saka et al. | |
| 6,132,232 A | 10/2000 | Okada | |
| 6,155,871 A | 12/2000 | Machado | |
| 6,394,849 B2 | 5/2002 | Kasai | |
| 6,603,074 B2 * | 8/2003 | Seo .............................. | 174/71 R |
| 6,635,824 B1 | 10/2003 | Oka | |
| 6,669,426 B1 | 12/2003 | Detter et al. | |
| 6,674,004 B2 * | 1/2004 | Ito et al. ....................... | 174/68.3 |
| 2007/0249189 A1 | 10/2007 | Kaneko et al. | |

FOREIGN PATENT DOCUMENTS

| | | |
|---|---|---|
| EP | 0622274 A1 | 11/1994 |
| EP | 1124287 A1 | 8/2001 |

OTHER PUBLICATIONS

International Search Report dated Jul. 28, 2009.

* cited by examiner

*Primary Examiner* — Dhiru R Patel
(74) *Attorney, Agent, or Firm* — Robert L. Stearns; Dickinson Wright, PLLC (57) ABSTRACT

An electrical junction assembly for a wiring harness (10) couples one or more branch wires (18) to a main trunk line (12). The junction assembly includes a housing (16) having an internal cavity into which is received first (34) and second (36) trunk terminals which interlock with one another and establish electrical conductivity therethrough. A branch wire (18) is inserted into the housing (16) through a branch opening (28). The branch wire (18) has a branch terminal (48) on its end which is adapted to mechanically connect to the interlocked first (34) and second (36) trunk terminals, thereby establishing electrical conductivity between the branch wire (18) and the main trunk line (12). A mounting member (56) is formed integrally on the housing (16) to provide a secure connection to a suitable mounting structure (58). A hook (40) within the cavity in the housing (16) automatically engages and securely retains the second trunk terminal (36) when inserted into a full operative position. Cable seals (54) on each of the wires (18, 30, 32) seal against the respective openings (22, 24, 28) into the housing (16) to protect the electrical connections established therein.

16 Claims, 7 Drawing Sheets

ELECTRICAL JUNCTION ASSEMBLY FOR WIRING HARNESS

CROSS REFERENCE TO RELATED APPLICATIONS

This invention claims priority to U.S. Provisional Application Ser. No. 60/980,873 filed Oct. 18, 2007, the entire disclosure of which is hereby incorporated by reference.

BACKGROUND OF THE INVENTION

1. Field of the Invention

This invention relates generally to an electrical junction assembly for a wiring harness, and more particularly toward a device for coupling one or more branch wires to a main trunk line.

2. Related Art

Automobiles and other vehicular applications, as well as non-vehicular applications, may include numerous electrical components which are energized through a series of discrete wires combined to establish an electrical system. Frequently, wires are grouped and bound together in a wiring harness for convenient installation in assembly operations.

In the case of wiring harnesses for motor vehicle applications, for example, every electrical component must be grounded to a suitable ground connection which is usually associated with the vehicle frame. It is common in automotive wiring harness systems, and in other wiring harness systems for other applications, to provide a single main trunk line which runs to electrical ground, and to provide spliced connections to branch wires which extend to the various electrical components. Thus, each electrical component is in conductive communication with the main trunk line via the branch wires, which in turn is connected to electrical ground. It is common practice to create a splice in the main trunk line so that each of the branch wires can find electrical ground.

Figure 1:
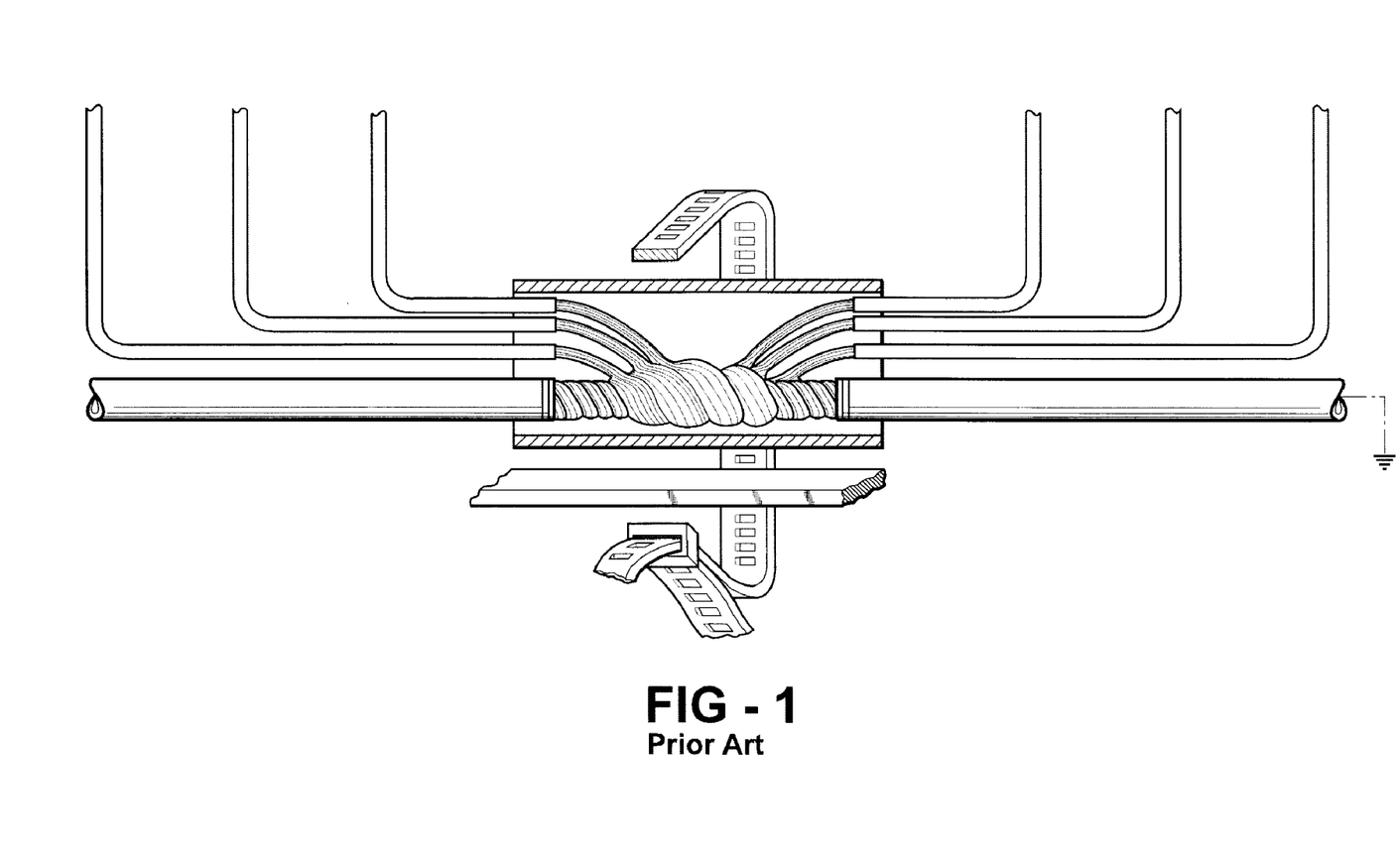
FIG. 1 is a fragmentary schematic view of a prior art wiring harness assembly including six branch wires spliced at a common location to a main trunk line.

Providing a splice in the main trunk line is a labor intensive process. First, a portion of the insulative jacket surrounding an electrically conductive core strand is bared. This is depicted in FIG. 1. Branch wires are routed to the bared portion on the main trunk line and there spliced, or twisted into electrical communication with the conductive core strand of the main trunk line. The spliced connection is then wrapped with tape or, as illustrated in FIG. 1, surrounded with a heat shrink tube material to seal against moisture infiltration, electrical shorts and abrasion. A cable tie or other such fastening mechanism is used to anchor the spliced wiring harness to various locations on a support structure.

A particular problem with this prior art technique can be readily appreciated by reference to FIG. 1. Firstly, the manual effort required to create wire splices in this fashion is discouraging, and therefore assembly line workers will tend to create as few splice connections as possible. This reluctance to create multiple splice locations results in numerous branch wires being routed to the same spliced connection point. In the process, a very substantial quantity of redundant branch wire will be run parallel to the main trunk line until it reaches the point of splicing. This is wasted wire, and adds not only cost but also weight to the wiring harness assembly. In a typical automobile, for instance, hundreds of additional feet of redundant branch wire are used in this fashion. The prior art has proposed numerous techniques for coupling wires to one another, but none have been found to provide the ease of use and reliability needed to couple one or more branch wires to a main trunk line in certain applications, including but not limited to vehicular wiring harness situations. Therefore, there is a long felt yet unmet need within the wiring arts to provide an electrical junction assembly for coupling one or more branch wires to a main trunk line, particularly in ground wire applications.

SUMMARY OF THE INVENTION

The subject invention provides an electrical junction assembly for coupling one or more branch wires to a main trunk line in a manner that overcomes the shortcomings and deficiencies represented by prior art techniques. The junction assembly comprises an electrically insulative housing defining an internal cavity. The housing has a pair of trunk line openings and at least one branch opening. All of the openings communicate directly with the internal cavity. A first trunk wire is provided having an electrically conductive core strand surrounded by an insulating jacket. A first trunk terminal is affixed to the core strand thereof. The first trunk terminal extends into the cavity through one of the trunk line openings. A second trunk wire is also provided having an electrically conductive core strand surrounded by an insulating jacket, and a second trunk terminal affixed to the core strand thereof. The second trunk terminal extends into the cavity through the other trunk line opening and directly interlocks with the first trunk terminal in the cavity. A branch wire is provided having an electrically conductive core strand surrounded by an insulating jacket. A branch terminal is affixed to the core strand thereof and extends into the cavity through the branch opening and directly interlocks with at least one of the first or second trunk terminals inside the cavity.

Thus, the junction assembly of this invention enables expedient coupling of one or more branch wires directly to a main trunk line in a reliable manner. As a result, numerous junction assemblies can be fitted to the main trunk line at any appropriate position along its length, thereby eliminating the need to run needless branch wire material parallel to the main trunk line.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 2:
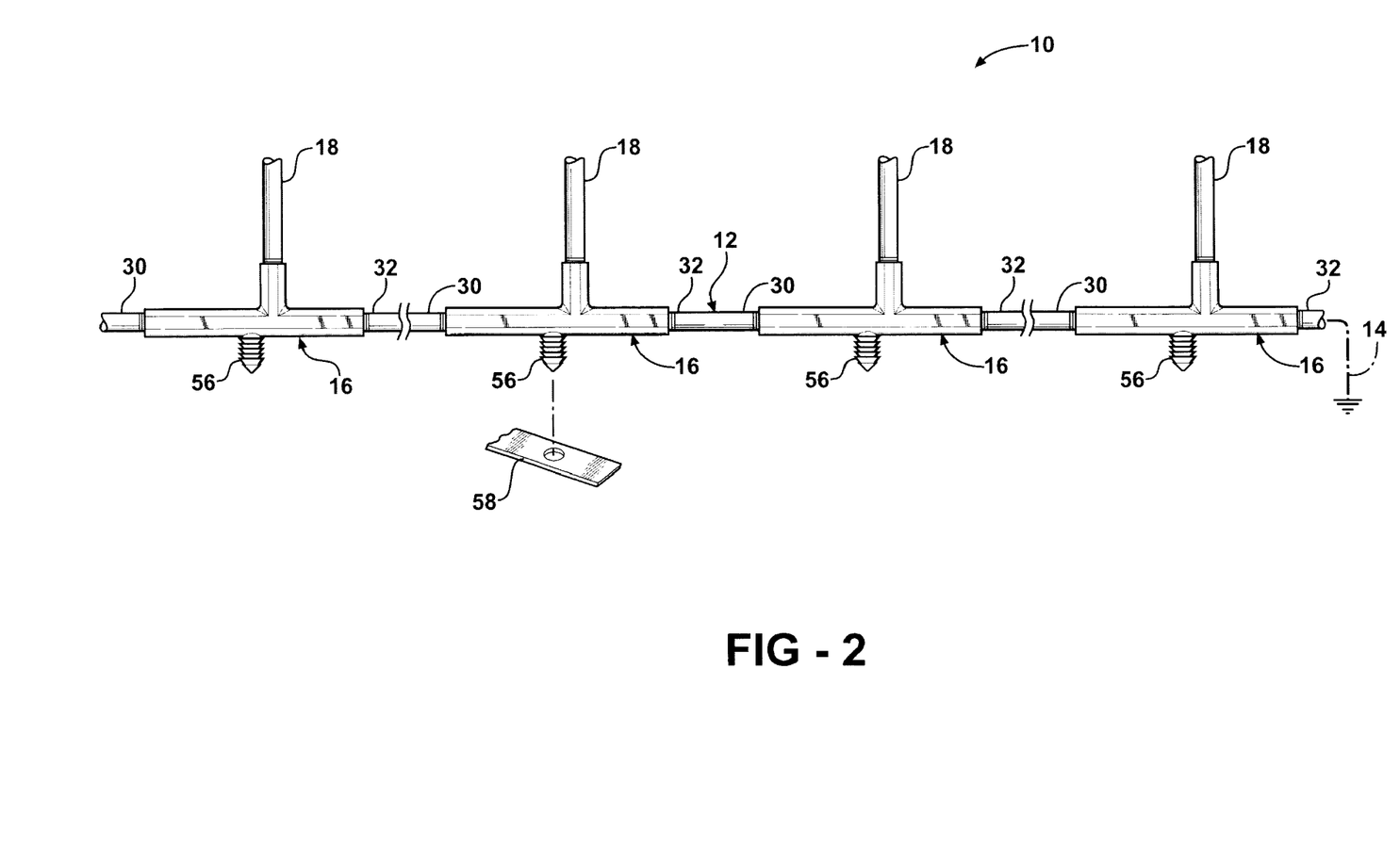
FIG. 2 is a schematic view of a wiring harness assembly similar in many respects to that of FIG. 1, but incorporating the novel electrical junction assemblies of this invention and thereby eliminating the wasteful, redundant use of branch wire running parallel to a main trunk line.

Referring to the Figures, wherein like numerals indicate like or corresponding parts throughout the several views, a schematic view of a wiring harness assembly is generally shown at 10 in FIG. 2. In this limited example, the wiring harness assembly 10 is depicted as merely the electrical ground, or earth, circuit fragment of a much larger and substantially more complex overall wiring harness system. To illustrate the point of this invention, however, and to set forth one preferred application of this invention, the wiring harness assembly 10 is depicted as a ground circuit having a main trunk line generally indicated at 12, which may be a fairly heavy gauge electrical wire, is adjoined at one end to a ground fixture 14 such as commonly found on the frame of a motor vehicle or other appropriate connection point. As will be appreciated by those with skill in the art, the main trunk line 12 is composed of an electrically conductive core strand, such as twisted copper or other suitable material, surrounded by an insulating jacket.

In FIG. 2, the wiring harness assembly 10 is shown including six discrete housings, generally indicated at 16. The housings 16 are made from electrically insulative material, such as a suitable rigid plastic of the type commonly used in electrical coupling applications. Alternatively, the housing 16 could be formed at least partially from a heat shrinkable material. Each housing 16 is somewhat T-shaped, into which a branch wire 18 is routed. The branch wire 18 extends to an electrical component (not shown) and provides a continuous electrical connection to the ground 14. The branch wires 18 may be of similar gauge to the main trunk line 12, or more commonly of a lighter gauge. Thus, the housings 18 provide a connection point for each branch wire 18 to adjoin the main trunk line 12 at a convenient location so as to avoid the redundant use of branch wire routing to a single splice point like was common in the prior art as illustrated in FIG. 1.

Figure 3:
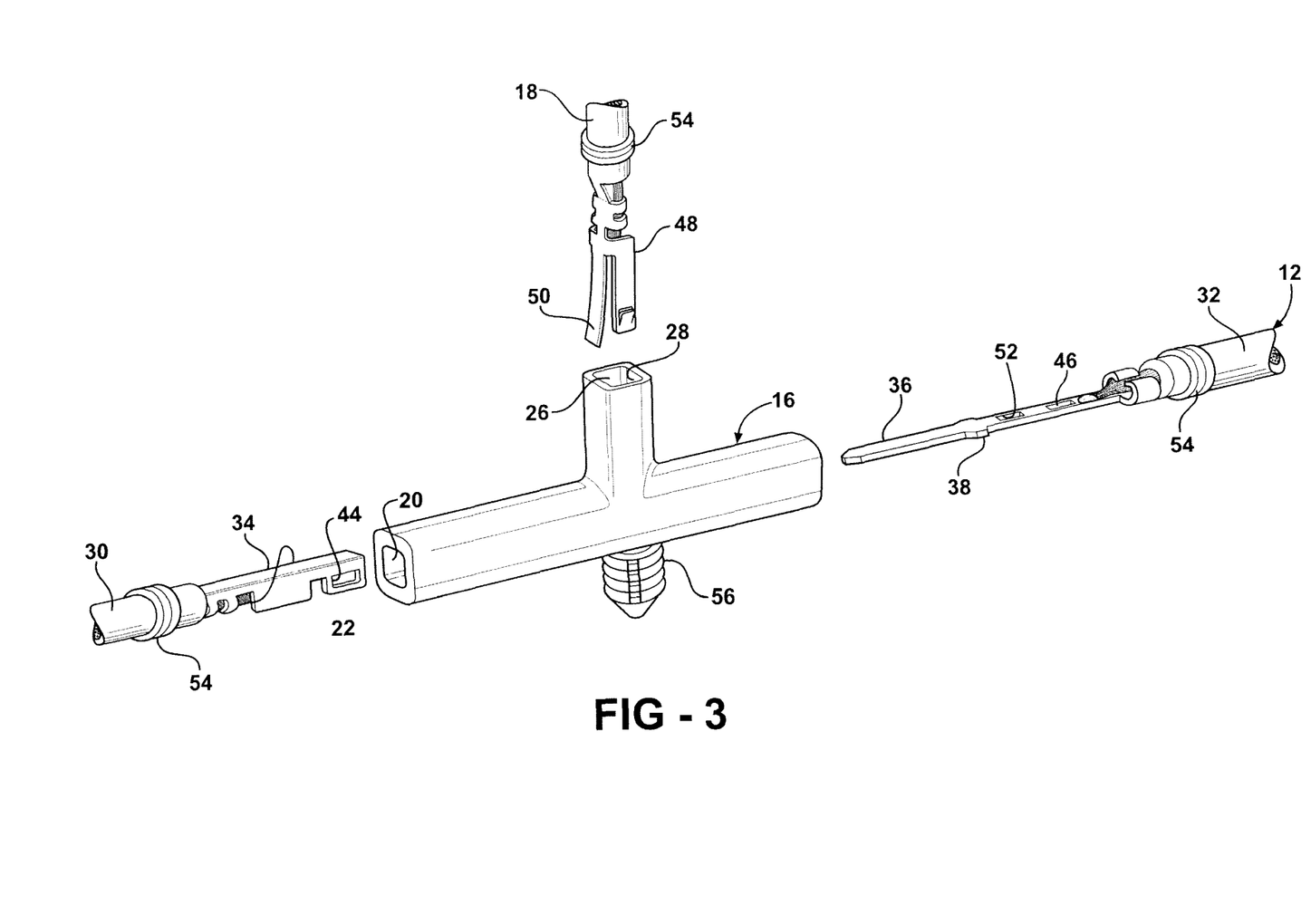
FIG. 3 is an exploded view of an electrical junction assembly of the subject invention wherein first and second trunk wires are coupled to a single branch wire.
Figure 4:
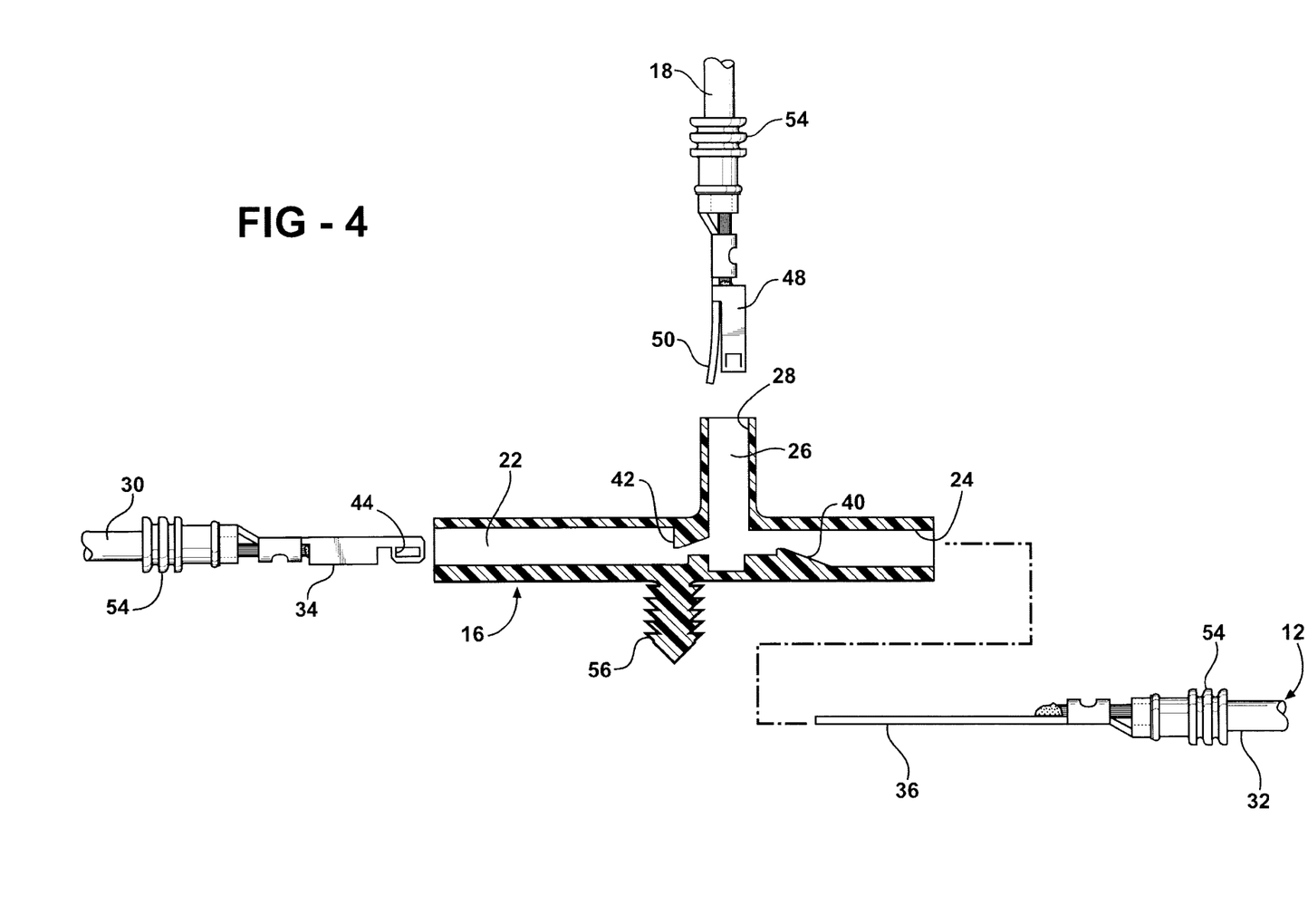
FIG. 4 is a front elevation view of the electrical junction assembly of FIG. 3, and showing the housing portion in cross-sections.
Figure 5:
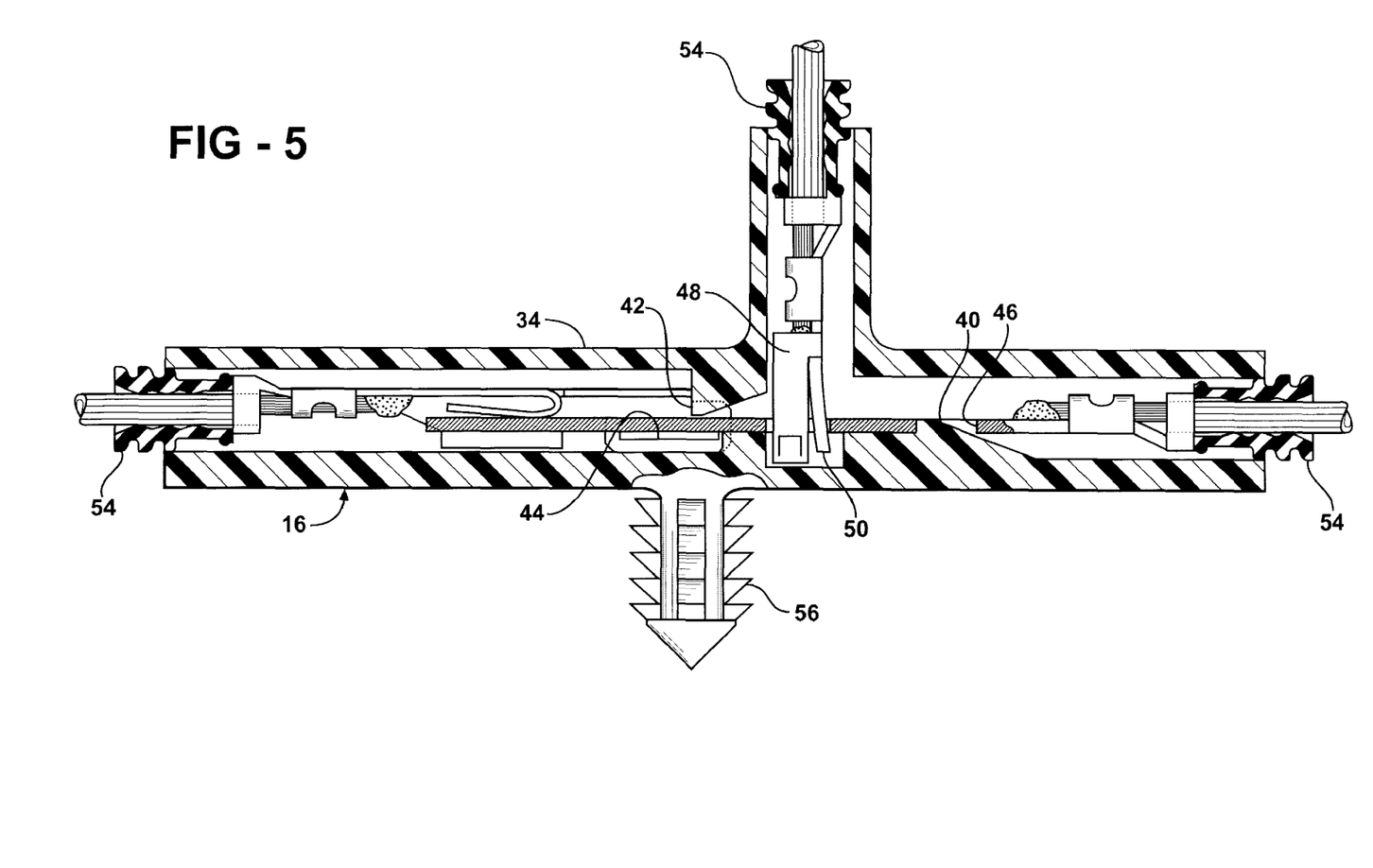
FIG. 5 is a view as in FIG. 4 but illustrating the first and second trunk terminals and branch terminal interlocking within the cavity of the housing in a normal, electrically connected condition.

Referring now to FIGS. 3-5, the subject junction assembly is shown in greater detail. The housing 16 defines an internal cavity which, in the preferred embodiment, comprises a generally axially extending main trunk passage 20 with a first trunk opening 22 at one end thereof and a second trunk opening 24 at an opposite end thereof. The cavity also includes a branch passage 26 that intersects the main trunk passage 20 and then extends outwardly toward a branch opening 28 at the end of the truncated T-portion of the housing 16. As illustrated in these Figures, the branch passage 26 is oriented generally perpendicular to the axis of the main trunk passage 20, however non-perpendicular arrangements are certainly possible.

For purposes of description, it is convenient to reference the main trunk line 12 in terms of a first trunk wire portion 30 and a second trunk wire portion 32. As viewed from FIGS. 3-5, the first trunk wire 30 is that portion of the main trunk line 12 which extends into the housing 16 from the left-hand side. The second trunk wire 32 is thus that fragmentary portion of the main trunk line 12 which extends into the housing 16 from the right-hand side. It will be appreciated by reference to FIG. 2, however, that the first 30 and second 32 trunk wires are essentially continuous portions of the main trunk line 12, with the segments between adjacent housings 16 being more or less arbitrarily referenced as either first 30 or second 32 trunk wire portions depending upon which housing 16 is chosen as the frame of reference.

Referring still to FIGS. 3-5, the first trunk wire 30 is shown including a first trunk terminal 34 affixed to the core strand thereof. The first trunk terminal 34 extends into the cavity in the housing 16 through the first trunk opening 22, and lies along the main trunk passage 20 as perhaps best shown in FIG. 5. Likewise, the second trunk wire 32 includes a second trunk terminal 36 affixed to its core strand and extendable into the cavity through the second trunk opening 24 so that the first 34 and second 36 trunk terminals lie generally coaxially within the main trunk passage 20. In a preferred embodiment of this invention, the first trunk terminal 34 is formed with a female fitting and the second trunk terminal 36 formed with a complimentary male fitting so that the first 34 and second 36 trunk terminals interlock with one another inside the main trunk passage 20, thereby establishing electrical conductivity from one trunk wire 30 to the next 32. To aid in the secure retention of the first 34 and second 36 trunk terminals once joined together, the male fitting of the second trunk terminal 36 may be formed as an elongated blade member having at least one, but preferably two, laterally extending barbs 38 that interlock with windows 44 in the first trunk terminal 34. Alternatively, the barbs 38 may be used for purposes other than securing the second trunk terminal 36 to the first trunk terminal 34.

To further aid in the retention of the first 30 and second 32 trunk wires within the housing 16, the cavity in the housing 16 may be provided with at least one hook 40 disposed along the trunk passage. The hook in this example takes the form of a ramped feature that automatically engages and snags the second trunk terminal 36 when it is moved into a fully seated position within the main trunk passage 20. Thus, corresponding features in the second trunk terminal 36 are provided to cooperate with the hook 40 and establish the snagging relationship. For example, the second trunk terminal 36 may be formed with an aperture 46 to receive and engage the hook 40. In the embodiment of this invention depicted in FIGS. 4 and 5, the first 34 and second 36 trunk terminals cannot be disassembled from the housing 16 once the hook 40 has been set. In other arrangements and configurations, which are within the skill of the average artisan, the terminals can be made to disassemble upon command. An abutment 42 may be formed in the main trunk passage 20 to limit travel of the first trunk terminal 34.

The branch wire 18 is likewise provided with a branch terminal 48 affixed to its core strand. The branch terminal 48 is received through the branch opening 28 into the branch passage 26 and there encounters the interlocked first 34 and second 36 trunk terminals. The branch terminal 48 is designed and so structured that it connects directly to one or both of the first 34 and second 36 trunk terminals to establish electrical conductivity therebetween. In the preferred embodiment of this invention illustrated in the drawing figures, however, the branch terminal 48 adjoins directly to the second trunk terminal 36 only, with forked members straddling the second trunk terminal 36 behind its barbs 38, and a tongue-like feature 50 seating within a secondary aperture 52. In this configuration, the branch terminal 48 is disconnectable from the housing 16 by simply applying a retractive force to the branch wire, which causes the branch terminal 48 to yield its spring-like frictional connection to the second trunk terminal 36.

Each of the first 30 and second 32 trunk wires, together with the branch wire 18, may be provided with cable seals 54 comprising annularly ribbed, elastomeric members configured to fully enclose the respective openings 22, 24, 28 so as to resist liquid and debris infiltration into the housing 16. Those with skill in the art will envision other arrangements for the cable seals 54, including a more traditional boot, heat shrink tubing, or any other suitable gasket, seal or covering technique.

The housing 16 may be formed with an integral mounting member 56. The mounting member 56 is shown in a fairly typical style useful in automotive applications often referred to as a tree, or Christmas tree, mounting post. This type of design, which is exemplary of any suitable mounting structure, comprises a plurality of angled fins extending from a common stalk. When inserted through a hole in a suitable mounting structure 58 (FIG. 2) the flexible fins deform upon passage through the hole and then re-expand on the opposite side thereby securing the housing 16 to the mounting structure 58. In a preferred embodiment of this invention, the stalk of the mounting member 58 extends generally parallel to the branch passage 26, and in an even more preferred embodiment is laterally offset from the branch passage 28 as best illustrated in FIGS. 4 and 5.

Figure 6:
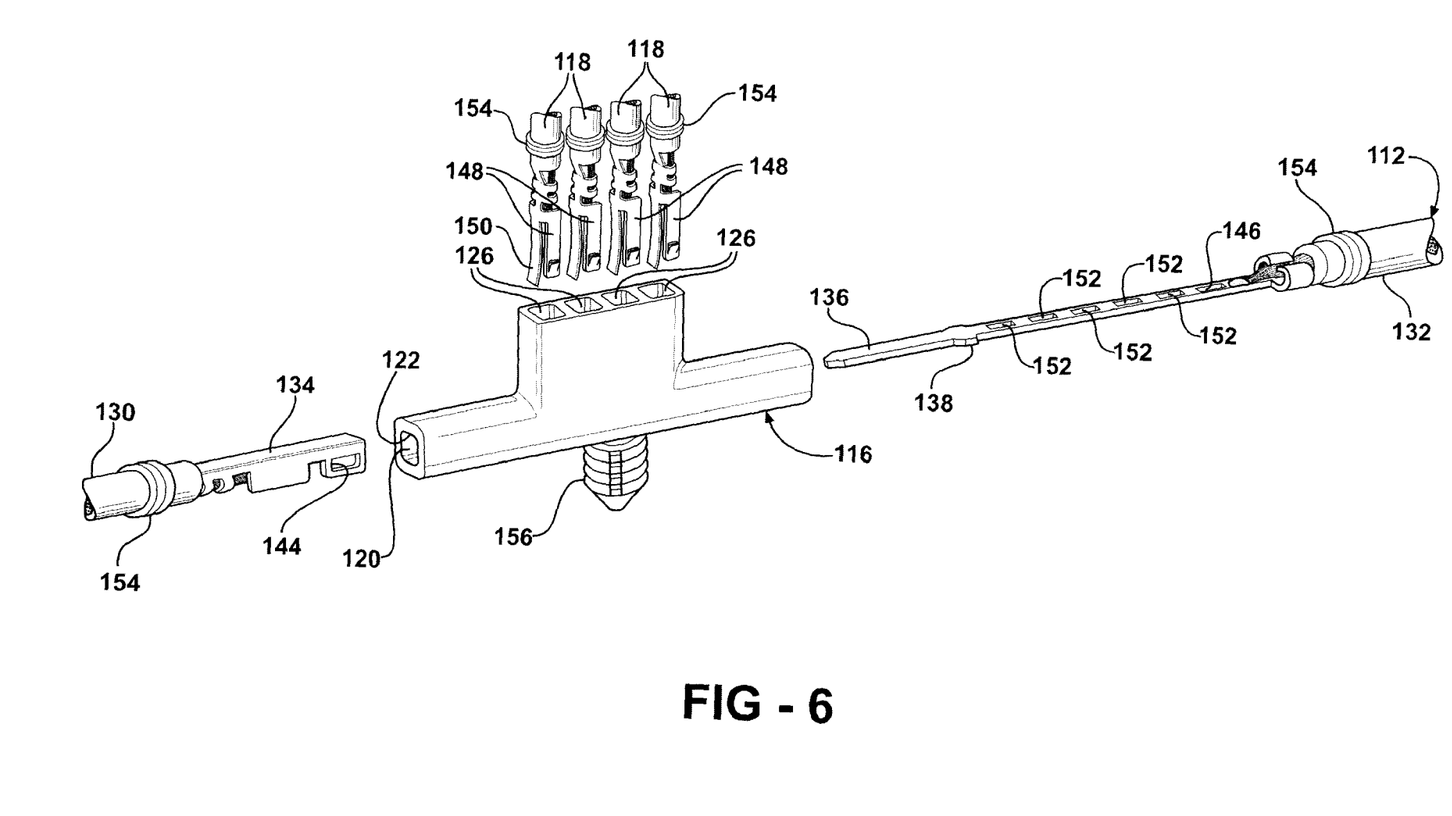
FIG. 6 is a perspective view as in FIG. 3 but depicting an alternative embodiment of the subject invention wherein a plurality of branch wires adjoin the first and second trunk wires within a common housing.
Figure 7:
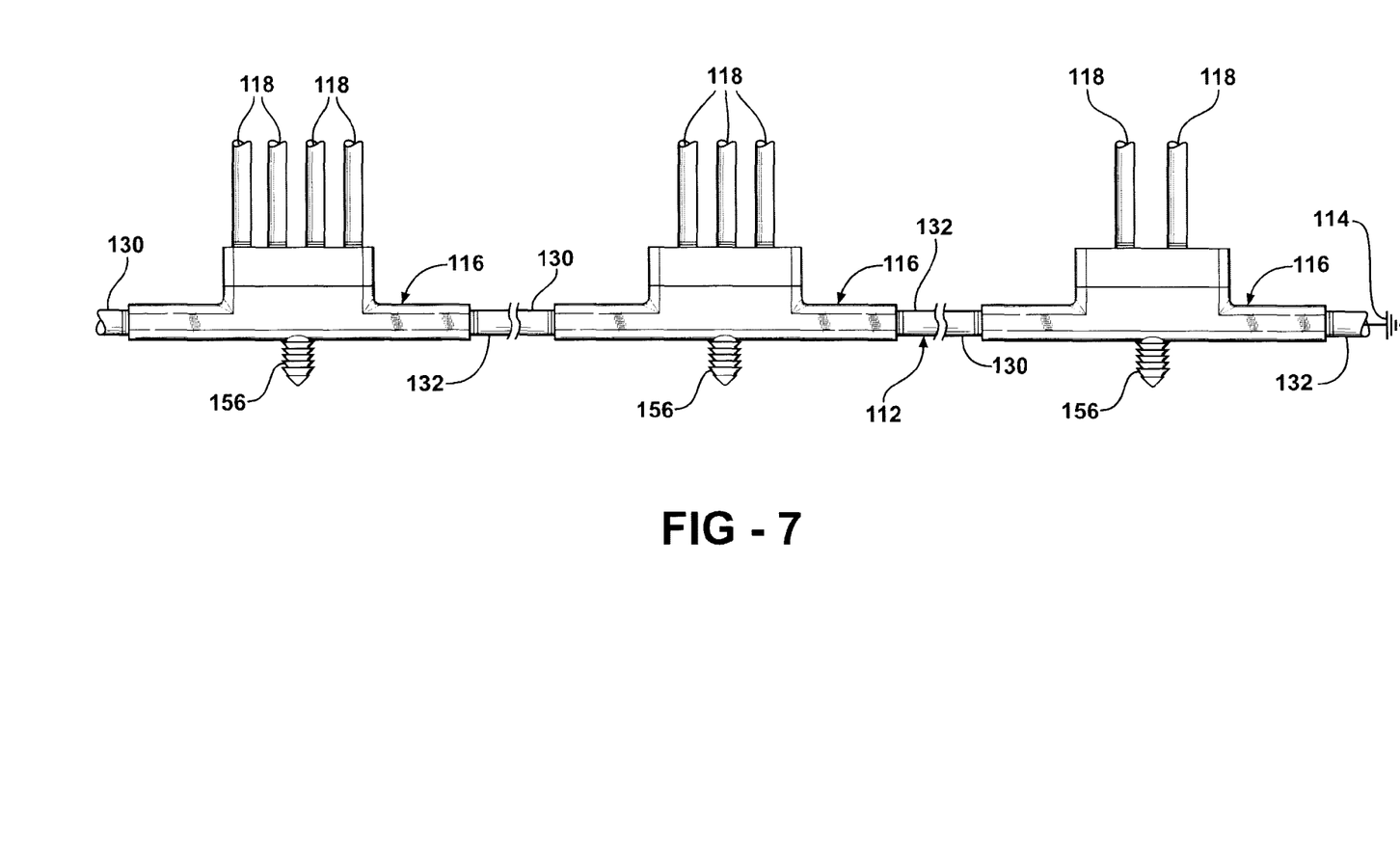
FIG. 7 is a schematic view akin to that of FIG. 2, but illustrating alternative electrical junction assemblies of this invention wherein two, three and four branch wire couplings are enabled.

In FIGS. 6 and 7, an alternative embodiment of the subject junction assembly is shown, wherein like or corresponding components are identified with corresponding reference numerals offset by 100. In the example of FIG. 6, the housing 116 includes four branch openings 128 each leading to a respective branch passage 126. Four branch wires 118, each with respective branch terminals 148 are insertable into respective branch openings 128, and therein make direct connection to either one or both of the first 134 and second 136 trunk terminals in a manner similar to that described above. It will be appreciated that the housing 116 can be formed with any number of branch opening and branch passage 126 features so as to accommodate the required number of branch wires 118.

FIG. 7 depicts, in schematic fashion, a wiring harness assembly 110 wherein the leftmost housing 116 accommodates four branch wires 118, the middle housing 116 accommodates three branch wires 118, and the rightmost housing 116 accommodates two branch wires 118. In all other respects, the alternative embodiment of this invention remains substantially similar to the preferred embodiments first described above.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An electrical junction assembly for coupling one or more branch wires to a main trunk line, said junction assembly comprising:
   an electrically insulative housing defining an internal cavity, said housing having a pair of trunk line openings and at least one branch opening, all of said openings communicating directly with said cavity;
   a first trunk wire having an electrically conductive core strand surrounded by an insulating jacket, and a first trunk terminal affixed to said core strand thereof, said first trunk terminal extending into said cavity through said one of said trunk line openings;
   a second trunk wire having an electrically conductive core strand surrounded by an insulating jacket, and a second trunk terminal affixed to said core strand thereof, said second trunk terminal extending into said cavity through the other of said trunk line openings and directly interlocking with said first trunk terminal in said cavity; and
   a branch wire having an electrically conductive core strand surrounded by an insulating jacket, and a branch terminal affixed to said core strand thereof, said branch terminal extending into said cavity through said at least one branch opening and directly interlocking with at least one of said first and second trunk terminals in said cavity; and
   wherein said first and second trunk terminals comprise respective female and male interlocking fittings.

2. The junction assembly of claim 1 wherein said cavity includes a generally axially extending main trunk passage with said first trunk opening at one end thereof and said second trunk opening at an opposite end thereof.

3. The junction assembly of claim 2 wherein said cavity includes at least one branch passage intersecting said main trunk passage, said branch opening communicating with said branch passage.

4. The junction assembly of claim 3 wherein said branch passage is oriented generally perpendicular to said axis of said main trunk passage.

5. The junction assembly of claim 3 wherein said cavity includes at least one hook disposed along said main trunk passage for snagging at least one of said first and second trunk terminals.

6. The junction assembly of claim 3 wherein said first and second trunk wires each include a cable seal configured to fully enclose said respective trunk line openings, and said branch wire includes a cable seal configured to fully enclose said branch opening.

7. The junction assembly of claim 1 wherein said male fitting of said second trunk terminal comprises an elongated blade member having at least one laterally extending barb.

8. The junction assembly of claim 7 wherein said branch terminal is configured to interlock directly with said barb of said blade member.

9. The junction assembly of claim 3 further including a mounting member extending from said housing and spaced from each of said trunk line openings.

10. The junction assembly of claim 9 wherein said mounting member is formed integrally with said housing.

11. The junction assembly of claim 10 wherein said mounting member includes a plurality of flexible fins extending from a common stalk.

12. The junction assembly of claim 11 wherein said stalk of said mounting member extending generally parallel to said branch passage.

13. The junction assembly of claim 12 wherein stalk is laterally offset from branch passage.

14. An electrical junction assembly for coupling a plurality of branch wires to a main trunk line, said junction assembly comprising:
   an electrically insulative housing defining an internal cavity, said housing having a pair of trunk line openings and a plurality of branch openings, all of said openings communicating directly with said cavity; said cavity including a generally axially extending main trunk passage with one of said trunk line openings at one end thereof and the other of said trunk line openings at an opposite end thereof, and a plurality of branch passages intersecting said main trunk passage;
   a mounting member extending integrally from said housing and spaced from each of said trunk line openings, said mounting member including a plurality of flexible fins extending from a common stalk;

a first trunk wire having an electrically conductive core strand surrounded by an insulating jacket, a first trunk terminal affixed to said core strand thereof, and a first cable seal disposed between said jacket and said first trunk terminal, said first trunk terminal extending into said cavity through said one of said trunk line openings;

a second trunk wire having an electrically conductive core strand surrounded by an insulating jacket, a second trunk terminal affixed to said core strand thereof, and a second cable seal disposed between said jacket and said second trunk terminal, said second trunk terminal extending into said cavity through the other of said trunk line openings and directly interlocking with said first trunk terminal in said cavity; and a branch wire associated with each of said branch passages, each said branch wire having an electrically conductive core strand surrounded by an insulating jacket, a branch terminal affixed to said core strand thereof, and a third cable seal disposed between said jacket and said branch terminal, said branch terminal extending into said cavity through a respective one of said branch openings and directly interlocking with at least one of said first and second trunk terminals in said cavity; and wherein said first and second trunk terminals comprise respective female and male interlocking fittings.

15. The junction assembly of claim 14 wherein said plurality of branch passages each intersect said main trunk passage and are all oriented generally parallel to one another.

16. The junction assembly of claim 14 wherein, said stalk of said mounting member is oriented generally parallel to said branch passages.

* * * * *